US 10,986,778 B2

(12) United States Patent
Chaney

(10) Patent No.: US 10,986,778 B2
(45) Date of Patent: Apr. 27, 2021

(54) WEED SEED DEVITALIZER CONTROL

(71) Applicant: Deere and Company, Moline, IL (US)

(72) Inventor: Mark M. Chaney, Geneseo, IL (US)

(73) Assignee: Deere & Company, Moline, IL (US)

(*) Notice: Subject to any disclaimer, the term of this patent is extended or adjusted under 35 U.S.C. 154(b) by 290 days.

(21) Appl. No.: 16/175,993

(22) Filed: Oct. 31, 2018

(65) Prior Publication Data

US 2020/0128732 A1 Apr. 30, 2020

(51) Int. Cl.
A01D 41/127 (2006.01)
A01D 43/00 (2006.01)
A01M 21/02 (2006.01)
A01D 43/14 (2006.01)
A01M 21/04 (2006.01)

(52) U.S. Cl.
CPC ....... A01D 41/127 (2013.01); A01D 41/1274 (2013.01); A01D 43/00 (2013.01); A01M 21/02 (2013.01); A01D 43/14 (2013.01); A01M 21/043 (2013.01)

(58) Field of Classification Search
CPC .............. A01D 42/005; A01D 41/127; A01D 41/1274; A01D 41/1277; A01D 41/1276; A01D 43/00; A01D 43/14; A01M 21/00–046
See application file for complete search history.

(56) References Cited

U.S. PATENT DOCUMENTS

| 3,580,257 | A | | 5/1971 | Teague et al. |
| 5,059,154 | A | * | 10/1991 | Reyenga .................. A01F 12/44 460/102 |
| 5,995,895 | A | * | 11/1999 | Watt ........................ A01D 75/28 701/50 |
| 6,199,000 | B1 | * | 3/2001 | Keller ................... A01C 21/005 701/50 |
| 8,152,610 | B2 | * | 4/2012 | Harrington ........... B02C 13/288 460/111 |
| 8,909,389 | B2 | * | 12/2014 | Meyer .................. A01D 75/185 701/2 |
| 9,723,790 | B2 | * | 8/2017 | Berry ................. A01D 41/1243 |
| 9,872,433 | B2 | * | 1/2018 | Acheson .............. A01D 41/127 |
| 9,928,584 | B2 | | 3/2018 | Jens et al. |
| 10,314,232 | B2 | * | 6/2019 | Isaac ........................ B02C 19/22 |
| 10,426,086 | B2 | * | 10/2019 | Van de Wege ......... A01F 12/40 |
| 10,485,178 | B2 | * | 11/2019 | Mayerle ............. A01D 41/1243 |
| 10,729,067 | B2 | * | 8/2020 | Hammer ................. G01L 1/146 |

(Continued)

FOREIGN PATENT DOCUMENTS

| CN | 203206739 | 9/2013 |
| EP | 3384754 A1 | 10/2018 |

(Continued)

OTHER PUBLICATIONS

European Search Report issued in counterpart European Patent Application No. 19205901.2 dated Mar. 17, 2020 (6 pages).

Primary Examiner — Adam J Behrens
(74) Attorney, Agent, or Firm — Rathe Lindenbaum LLP

(57) ABSTRACT

An example harvester that may include a weed seed devitalizer and a controller that automatically adapts or adjusts the weed seed devitalizer. The controller is to receive data from at least one sensor indicating forthcoming weed seeds and to output control signals controlling the weed seed devitalizer based on the data.

18 Claims, 3 Drawing Sheets

(56) References Cited

U.S. PATENT DOCUMENTS

| | | | |
|---|---|---|---|
| 2003/0187560 A1* | 10/2003 | Keller | A01C 21/005 701/50 |
| 2009/0074243 A1* | 3/2009 | Missotten | A01D 41/1277 382/100 |
| 2010/0121541 A1* | 5/2010 | Behnke | A01D 41/1277 701/50 |
| 2011/0059782 A1* | 3/2011 | Harrington | B02C 13/288 460/149 |
| 2017/0235471 A1* | 8/2017 | Scholer | G01F 1/666 715/772 |
| 2018/0000011 A1* | 1/2018 | Schleusner | G06T 7/0004 |
| 2018/0070534 A1* | 3/2018 | Mayerle | A01D 41/1243 |
| 2018/0153084 A1 | 6/2018 | Calleija et al. | |
| 2019/0261560 A1* | 8/2019 | Jelenkovic | A01D 75/00 |
| 2019/0364734 A1* | 12/2019 | Kriebel | A01D 41/1278 |

FOREIGN PATENT DOCUMENTS

| | | | | |
|---|---|---|---|---|
| EP | 3586592 A2 | | 1/2020 | |
| JP | WO 2018235486 | * | 5/2018 | A01B 69/00 |
| WO | 2017008161 A1 | | 1/2017 | |
| WO | WO2018235486 | | 12/2018 | |

* cited by examiner

WEED SEED DEVITALIZER CONTROL

BACKGROUND

Weeds reduce crop yield by competing for water, sunlight and nutrients. Attempts to control weeds include the application of chemicals or tillage. Both attempts may be expensive and harmful. During harvesting, weeds and weed seed are separated from the grain being harvested. The weed seed is often discharged behind the harvester where it may promulgate the next growing season. Some harvesters are equipped with weed seed devitalizers that impair the ability of the discharged weed seed to promulgate.

Figure 1:
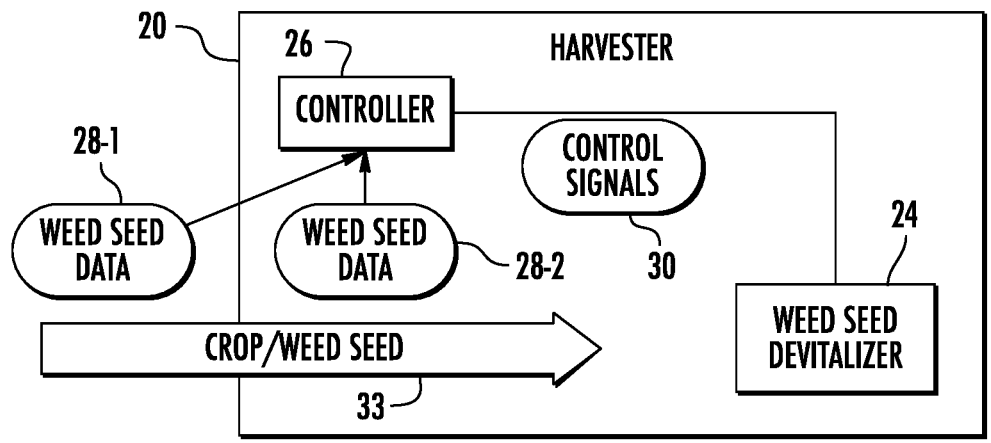
FIG. 1 is a block diagram schematically illustrating portions of an example harvester having an example weed seed control system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example harvesters, weed seed control methods and weed seed devitalizer controller instructions that automatically adapt or adjust the operation of a weed seed devitalizer of a harvester to adjust to varying weed seed conditions. As a result, the harvester may better accommodate regions of a field having a high density or number of weeds and corresponding weed seeds. Conversely, crops are being harvested in regions of a field having a lower density or number of weeds or weed seeds, the weed seed devitalizer may be adjusted to conserve energy and increased harvester throughput.

The example harvesters, weed seed control methods and weed seed devitalizer controller instructions obtain data indicating forthcoming weed seeds. For purposes of disclosure, the term "forthcoming" with respect to weed seeds refers to weed seeds expected to reach the weed seed devitalizer during current harvesting by the harvester. The forthcoming weed seeds may be those weed seeds predicted based upon weed growth or plant population prior to harvest or immediately in front of a harvester during harvest. The forthcoming weed seeds for which data is obtained may be for those weed seeds that are currently being conveyed by the harvester, such as weed seeds being conveyed by a header of the harvester, being conveyed through the harvester or separated from grain within the harvester. The data may be obtained from airborne sensors or sensors carried by the harvester. The data may be obtained from preharvest field maps or historical field maps indicating prior weed densities are populations, wherein geo-positioning data and such maps are used to identify weed seed data for crops currently being harvested or about to be harvested by a harvester.

The obtained data may reflect one of many parameters regarding weed seed. For example, the data may indicate the density of weeds, the estimated mass, number or volume of weed seeds, the rate at which weeds or weed seeds are forthcoming, the size, weight or density of the weed seeds and/or a type or types of weed seeds that are expected or forthcoming.

Based upon such data, an operational state of the weed seed devitalizer is adjusted. For example, the weed seed devitalizer may be actuated between an off state and an on state based upon the data. The weed seed devitalizer may be actuated or adjusted from a first on state to a second on state different than the first on state. The weed seed may be directed to and through different screens based on the data. Different chemicals or radiation may be applied to the weed seeds based on the data. The weed seed may be differently impacted or otherwise impaired based upon the data. For example, in implementations where the weed seed devitalizer impacts the weed seed to damage the weed seed, the force applied to the weed seed to damage or impact the weed seed may be adjusted based upon the data.

Disclosed herein is an example harvester that may include a weed seed devitalizer and a controller. The controller is configured to, has specific logic, programming or coded instructions to receive data indicating forthcoming weed seeds and to output control signals controlling the weed seed devitalizer based on the data.

Disclosed is an example weed seed control method. The example weed seed control method involves receiving data indicating weed seeds prior to the weed seeds arriving at a weed seed devitalizer. The method further comprises preemptively adjusting operation of the weed seed devitalizer based upon the data.

Disclosed are example controller instructions, the controller instructions stored upon or provided by a non-transitory computer-readable medium. The instructions comprise instructions to direct a processing unit to obtain data indicating forthcoming weed seeds. The instructions further comprise instructions to direct the processing unit to output control signals to control operation of a weed seed devitalizer based upon the obtained data.

FIG. 1 is a block diagram schematically illustrating portions of an example harvester 10. Harvester 10 comprises a mechanism that is to be propelled across, pulled across or otherwise moved across a field or other growing medium, wherein harvester 10 separates crops from the growing medium. One example of such a harvester is a combine harvester that carries out threshing of grain from remaining biomass of the crop. Such harvesters may gather and thresh crops such as corn, wheat, oats, barley and the like. In other implementations, harvester 10 may comprise other forms of harvesters for harvesting other types of crops.

In addition to the cross being harvested, the growing medium may support weed populations. Such weeds may be undesirably gathered by harvester 10 during harvesting of the targeted crops. During threshing of the crop, the weed seeds may also be threshed or separated from remaining biomass, such as stocks, leaves and the like. Although separated from the grain, such weed seeds may be discharged from the harvester as a harvester traverses a field a growing medium. As will be described hereafter, harvester 10 devitalizes such weed seeds prior to discharging the weed seeds back to the field are growing medium. Such devitalization impairs the ability of the individual weed seeds to germinate or otherwise reproduce weed seeds during the next growing season. As will further be described hereafter, rather than operating the weed seed devitalizer and carrying out weed seed devitalization with constant unchanging parameters, harvester 10 automatically adjusts the operational parameters of such devitalization to accommodate changing weed conditions. As a result, the harvester 10 may better accommodate regions of a field having a high density or number of weeds and corresponding weed seeds. Conversely, crops are being harvested in regions of a field having a lower density or number of weeds or weed seeds, the weed seed devitalizer may be adjusted to conserve energy and increased harvester throughput. Harvester 10 comprises weed seed devitalizer 24 and controller 26.

Weed seed devitalizer 24 (schematically shown) comprise a device that devitalizes weed seed, a device that interacts with the weed seed such that the weed seed has a lower ability to promulgate or germinate in a subsequent growing season. In one implementation, weed seed devitalizer 24 comprises movable members that are rotated or otherwise driven so as to impact and damage the weed seed. For example, in one implementation, weed seed devitalizer 24 may comprise a motor, hydraulic or electric, having members, such as panels or blades, rotated at a high velocity so as to impact weed seed in a chamber and damage the weed seed to an extent so as to impair the ability of the weed seed to germinate or grow in a following growing season. In another implementation, weed seed devitalizer 24 may devitalize the weed seed in other manners. For example, weed seed devitalizer 24 may apply chemicals and/or may apply radiation to an extent so as to devitalize the weed seed. In some implementations, weed seed devitalizer may impact the weed seed, apply chemicals and radiation with the combined effect of inhibiting the weed seed or preventing the weed seed from germinating or growing in a following growing season.

Controller 26 comprises an electronic device that received data 28-1, 28-2 indicating forthcoming weed seeds and that outputs control signals 30 controlling weed seed devitalizer 24 based on the data. In one implementation, controller 26 comprises a processing unit and a non-transitory computer-readable medium that directs the processing unit to analyze the weed seed data pertaining to the forthcoming weed seeds and which automatically outputs control signals adjusting the operational parameters of weed seed devitalizer 24.

As schematically shown in FIG. 1, the weed seed data received by controller 26 and analyzed by controller 26 to generate and output control signals 30 may be based upon weed seed data 28-1 sensed or acquired outside of harvester 10. For example, the forthcoming weed seeds 33 may be those weed seeds predicted based upon weed growth or plant population prior to harvest or immediately in front of a harvester during harvest. The data may be obtained from airborne sensors or sensors carried by the harvester. The data may be obtained from preharvest field maps or historical field maps indicating prior weed densities are populations, wherein Geo positioning data and such maps are used to identify weed seed data for crops currently being harvested or about to be harvested by a harvester.

As further schematically shown by FIG. 1, the weed seed data 28-2 received by controller 26 and analyzed by controller 26 to generate and output control signals 30 may be based upon weed seeds that are currently being conveyed by the harvester, such as weed seeds being conveyed by a header of the harvester, being conveyed through the harvester or separated from grain within the harvester.

The obtained data 28-1, 28-2 may reflect one of many parameters regarding weed seed. For example, the data may indicate the density of weeds outside of harvester 10, the density of weed seeds in the grain or crop being conveyed through harvester 10, the estimated mass, number or volume of weed seeds, the rate at which weeds or weed seeds are forthcoming, the size, weight or density of the weed seeds and/or a type or types of weed seeds that are expected or forthcoming.

Based upon such data, controller 26 outputs control signals 30 to adjust an operational state of the weed seed devitalizer 24. First control signals may be output in response to a first set of weed seed data at a first moment in time while second different control signals may be output in response to a second set of weed seed data at a second point in time. For example, the control signals may actuate the weed seed devitalizer 24 between an off state and an on state based upon the data. The control signals 30 may actuate or adjust the weed seed devitalizer 24 from a first on state to a second on state different than the first on state. The control signals 30 may cause an actuator to adjust the positioning of one or more grain flow valve mechanisms, baffles of the like to direct the crop flow and its weed seed through different screens of the weed seed devitalizer 24 based on the data. The control signals 30 may cause different nozzles, sprayers or chemical discharging devices to differently discharge chemicals onto the weed seed prior to their discharge from harvester 10. The control signals 30 may cause and radiation emitting device to differently apply weed seed devitalizing radiation to the weed seeds based on the data.

The control signals 30 may adjust the operation of a motor or other actuator to adjust the force or rate at which the weed seeds are impacted and impaired. For example, in implementations where the weed seed devitalizer 24 impacts the weed seed to damage the weed seed, the force applied to the weed seed to damage or impact the weed seed may be adjusted based upon the data. Because the operation of weed seed devitalizer 24 is automatically and dynamically adjusted to varying weed seed conditions, weed seed devitalizer 24 may reliably devitalize weed seed at times of high weed seed flow. Conversely, when such weed seed data 28-1, 28-2 indicates low levels of weed seed flow, weed seed devitalizing 24 may be turned off or turned down to conserve energy and facilitate faster crop throughput.

Figure 2:
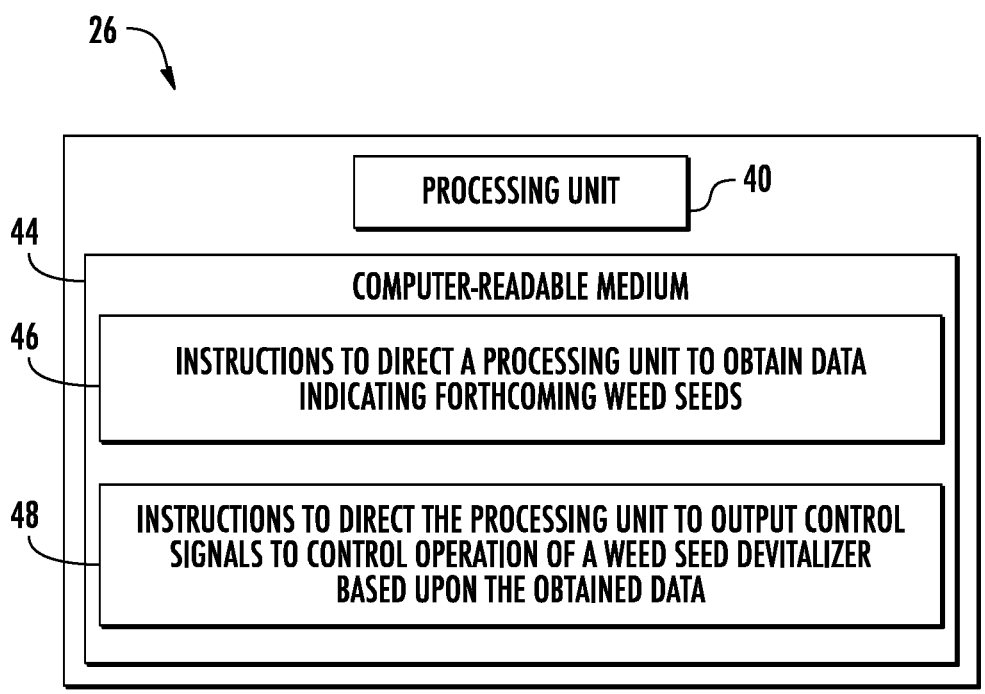
FIG. 2 is a block diagram schematically illustrating portions of an example controller of the harvester of FIG. 1.

FIG. 2 is a block diagram illustrating portions of an example controller 26. As shown by FIG. 2, controller 26 comprises processing unit 40 and non-transitory computer-readable medium 44. Medium 44 contains instructions for directing processing unit 40. Medium 44 comprises instructions 46 for directing processing unit 40 to obtain weed seed data 28-1, 29-2, data indicating forthcoming weed seeds. In one implementation, the data may be obtained by retrieving and reading a historical weed or weed seed map. The weed or weed seed map may indicate historical weed densities or weed seed production in particular regions of a field from prior growing seasons or from the current growing season prior to harvest. Using the map and Geo data pertaining to the current location of the harvester in the field, processing unit 40 may determine or estimate forthcoming weed or weed seed characteristics such as the density of weeds outside of harvester 10, the estimated mass, number or volume of weed seeds, the rate at which weeds or weed seeds are forthcoming, the size, weight or density of the weed seeds and/or a type or types of weed seeds that are expected or forthcoming.

In another implementation, controller 26 may alternatively or additionally acquire weed seed data 28-1 from sensors that sense regions adjacent harvester 10 during harvesting. For example, such data may be obtained from airborne sensors such as drones or satellites. Such data may be obtained from forwardly supported sensors carried by harvester 10 that detect weeds or weed seeds in front of or otherwise adjacent harvester 10. In some implementations, controller 26 may alternatively or additionally acquire weed seed data 28-2 regarding separated weeds or weed seeds currently moving within and through harvester 10. For example, controller 26 may include infrared sensors, optical sensors, filtering sensors or the like that interact with weed seeds flowing through harvester 10 to obtain or acquire such weed or weed seed information.

As further shown by FIG. 2, instructions 44 further comprise instructions 48 to direct a processing unit to output control signals to control operation of a weed seed devitalizer, such as weed seed devitalizer 24, based upon the obtained data. In one implementation, instructions 48 may direct processing unit 40 to compare a weed seed data parameter to a predefined threshold, wherein satisfaction of the threshold automatically causes the processing and 40 to output control signal adjusting the operational state of weed seed devitalizer 24.

In one implementation, the weed seed data may comprise multiple different parameters or factors, wherein the instructions 48 because the processing unit 42 compare each of the different parameters or factors to different thresholds and wherein the comparison may trigger the automatic output of control signals that adjust operation of the weed seed devitalizer 24. In one implementation, different weed seed parameters may have different weightings or weights depending upon the ascribed importance of such factors in the overall adjustment of weed seed devitalizer 24.

For example, the adjustment of weed seed devitalizer 24 by controller 26 may be based upon weed seed data comprising the type of weed seed and the rate at which the weed seed is passing through harvester 10. Different types of weed seed and different weed seed flow rates may trigger different operational states for weed seed devitalizer 24. For example, a first type of weed seed from a first type of weed may trigger a first operational state of weed seed devitalizer 24 while a second different type of weed or weed seed may trigger a second different operational state of weed seed devitalizer 24. A first flow rate of weed seed may trigger a first operational state of weed seed devitalizer 24 while a second different flow rate of weed seed may trigger a second different operational state of weed seed 24. The selected operational state may, in some implementations, the based upon a combined aggregate score derived from both factors taken together, wherein different operational states of weed seed devitalizer 24 are triggered automatically in response to different scores. In some implementations, the relative contribution of the two factors to the score may depend upon different weights assigned to each of the factors. In other implementations, the automatic triggering of different states for weed seed devitalizer 24 may be based upon more than two weed or weed seed parameters or factors.

In one implementation, instructions 48 may direct processing unit 40 to compare such weed seed data against different candidate operational states for weed seed devitalizer 24 contained in a lookup table. In yet other implementations, instructions 48 may direct processing unit 40 to utilize different values for the weed seed data in a formula or calculation, wherein the result of the calculation is compared against a threshold or corresponded to a particular setting in a lookup table to determine what control signals 30 should be output to weed seed devitalizer 24.

Instructions 48 may direct processing unit 40 to output control signals, based upon the weed seed data, to actuate the weed seed devitalizer 24 between an off state and an on state based upon the data. The control signals 30 may actuate or adjust the weed seed devitalizer 24 from a first on state to a second on state different than the first on state. The instructions 48 may direct processing unit 40 to output control signals that cause an actuator to adjust the positioning of one or more grain flow valve mechanisms, baffles of the like to direct the crop flow and its weed seed through different screens of the weed seed devitalizer 24 based on the data. The instructions 48 may output control signals, based upon the weed seed data directing the processing unit 40 to cause different nozzles, sprayers or chemical discharging devices to differently discharge chemicals onto the weed seed prior to their discharge from harvester 10. The instructions 48 may direct a processing unit 40, based upon the weed seed data, to output control signals causing a radiation emitting device to differently apply weed seed devitalizing radiation to the weed seeds.

In some implementations, the instructions 48 may cause a processing unit 40 to output control signals that adjust the operation of a motor or other actuator to just the force or rate at which the weed seeds are impacted and impaired. For example, in implementations where the weed seed devitalizer 24 impacts the weed seed to damage the weed seed, the force applied to the weed seed to damage or impact the weed seed may be adjusted based upon the data. Because the operation of weed seed devitalizer 24 is automatically and dynamically adjusted to varying weed seed conditions, weed seed devitalizer 24 may reliably devitalize weed seed at times of high weed seed flow. Conversely, when such weed seed data 28-1, 28-2 indicates low levels of weed seed flow, the instructions 48 may direct a processing unit 40 to output control signals turning off or slowing weed seed devitalizer 24 to conserve energy and facilitate faster crop throughput.

Figure 3:
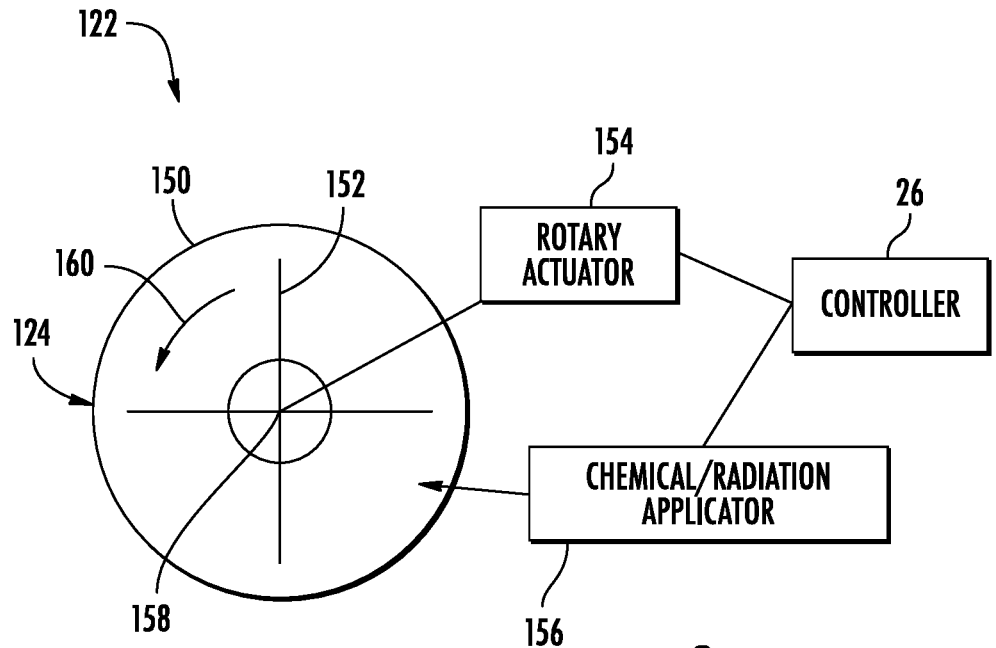
FIG. 3 is a diagram schematically illustrating portions of an example weed seed control system.

FIG. 3 is a diagram illustrating an example weed seed control system 122 having an example weed seed devitalizer 124 under the control of controller 26 (described above). Weed seed devitalizer 124 may be employed as weed seed devitalizer 24 in harvester 10. Weed seed devitalizer 124 carries out weed seed devitalization by both impacting the weed seed and by applying chemical and/or radiation to the weed seeds. In other implementations, weed seed devitalizer 124 may devitalize such weed seeds through just impaction or through just the application of chemical and/or radiation. Weed seed devitalizer 124 comprises impaction chamber 150, impactor 152, rotary actuator 154 and chemical/radiation applicator 156.

Impaction chamber 150 comprises a chamber which receives weed seed that is passed through a harvester, such as harvester 10, but prior to discharge of the weed seed from the harvester. In some circumstances, weeds and other crop material may additionally be received within chamber 150. In one implementation, impaction chamber 150 may be located at a rear and of a harvester. Impaction chamber 150 has an inlet from above through which the weed seed is received and an outlet, such as a side outlet, through which the devitalized and damaged weed seed may be discharged.

Impactor 152 comprises a paddle, blade or other structure rotatably supported for rotation about an axis 158. Rotary actuator 154 comprise an actuator operably coupled to impactor 152 so as to rotatably drive impactor 152 about axis 158, such as in the direction indicated by arrow 160. Rotary actuator 154 is configured to rotate impactor 152 across a variety of predefined or a continuum of different rotational speeds. Rotary actuator 154 is configured to rotate impactor 152 at a sufficient speed so as to damage and devitalize the received crop seed. In one implementation, rotary actuator 154 may comprise a hydraulic motor with appropriate drivetrain or gear train between it and impactor 152. In yet another implementation, rotary actuator 154 may comprise an electric motor with an appropriate drivetrain or gear train between it and impactor 152.

Chemical/radiation applicator 156 comprise an applicator that applies chemicals and/or radiation to the weed seed. In one implementation, applicator 156 applies chemicals and/or radiation to the weed seed prior to the weed seed entering chamber 150. In another implementation, applicator 156 applies the chemicals and/or radiation to the weed seed as it is being discharged from chamber 50. In yet another implementation, applicator 156 applies a chemicals and/or radiation to the weed seed while the weed seed is being impacted within chamber 150. In one implementation, applicator 156 comprises a sprayer that sprays a chemical, such as a herbicide to the weed seeds. In one implementation, applicant 156 comprises a source of radiation that is directed at the weed seeds.

As described above, controller 26 controls the operation of states of rotary actuator 154 and chemical/radiation applicator 156 based upon weed seed data indicating characteristics of forthcoming weeds or weed seed. Controller 26 outputs control signals to actuator 154 and applicator 1562 preemptively adjust and ready actuator 154 and applicator 1562 appropriate operational states for when the weed or weed seed arrives at weed seed devitalizer 124.

For example, controller 26 may actuate rotary actuator 154 between an off state and an on state based upon the forthcoming weed seed data. Controller 26 may actuate or adjust rotary actuator 154 from a first on state to a second on state different than the first on state. In some implementations, controller 26 may output control signals that adjust the operation of rotary actuator 154 to adjust the velocity of rotary actuator 154 and the force or rate at which the weed seeds are impacted and impaired. For example, different types of weed seeds may have outer shells with different resiliency or hardness which require rotary actuator 154 to drive impactor 152 at different respective velocities to achieve devitalization of the respective weed seeds.

Controller 26 may output control signals, based upon the weed seed, causing applicator 156 to apply chemicals and/or radiation at different intensities, at different rates, at different spray or distribution patterns or areas or at different concentrations. Based upon the weed seed data, controller 26 may output control signals causing a radiation emitting device to differently apply weed seed devitalizing radiation frequencies, wavelengths or fields/concentrations to the weed seeds. Because the operation of weed seed devitalizer 124 is automatically and dynamically adjusted to varying weed seed conditions, weed seed devitalizer 124 may reliably devitalize weed seed at times of high weed seed flow. Conversely, when such weed seed data indicates low levels of weed seed flow, controller 26 output control signals turning off or slowing actuator 154 or slow the rate at which chemicals and/or radiation are applied to conserve energy, reduce cost and facilitate faster crop throughput.

Figure 4:
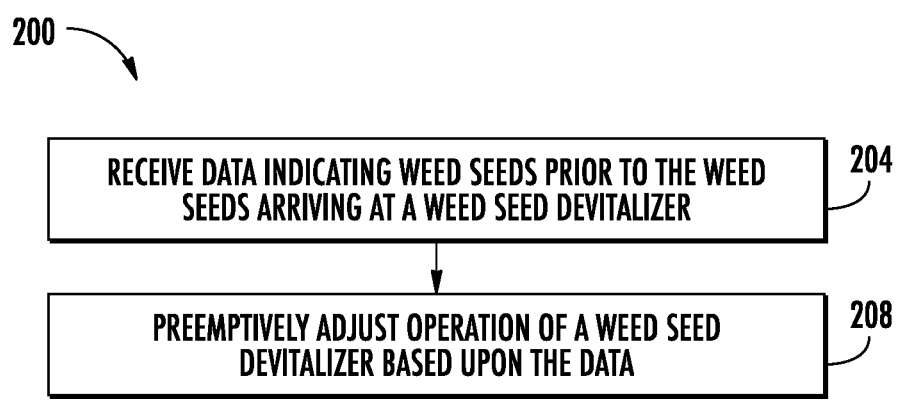
FIG. 4 is a flow diagram of an example weed seed control method.

FIG. 4 is a flow diagram of an example weed seed control method 200. Method 200 may be carried out by a controller of harvester 10 or with a controller of other similar harvesters. As indicated by block 204, a controller, such as controller 26, receives data indicating weed seeds prior to the weed seeds arriving at a weed seed devitalizer. As discussed above, the data may correspond to weeds still growing in a growing medium adjacent to a harvester, weeds after being severed from the growing medium but being conveyed by the harvester, such as along the header of the harvester or from weed material or direct weed seed detection during conveyance within the harvester. As discussed above, the weed seed data may comprise a single parameter or may comprise multiple different parameters such as the density of weeds outside of a harvester, the density of weed seeds in the grain or crop being conveyed through harvester 10, the estimated mass, number or volume of weed seeds, the rate at which weeds or weed seeds are forthcoming, the size, weight or density of the weed seeds and/or a type or types of weed seeds that are expected or forthcoming.

As indicated by block 208, based upon the data, the controller preemptively adjusts operation of weed seed devitalizer, changes the operational state of the weed seed devitalizer to accommodate changes in the flow of weed seeds. As discussed above, based upon such data, the controller may output first control signals in response to a first set of weed seed data at a first moment in time while outputting second different control signals in response to a second set of weed seed data at a second point in time. For example, the control signals may actuate the weed seed devitalizer between an off state and an on state based upon the data. The control signals may actuate or adjust the weed seed devitalizer from a first on state to a second on state different than the first on state. The control signals may cause an actuator to adjust the positioning of one or more grain flow valve mechanisms, baffles of the like to direct the crop flow and its weed seed through different screens of the weed seed devitalizer based on the data. The control signals may cause different nozzles, sprayers or chemical discharging devices to differently discharge chemicals onto the weed seed prior to their discharge from harvester. The control signals may cause and radiation emitting device to differently apply weed seed devitalizing radiation to the weed seeds based on the data. The control signals may just the speed at which an impactor is driven into or against the weed seed to damage the weed seed.

Figure 5:
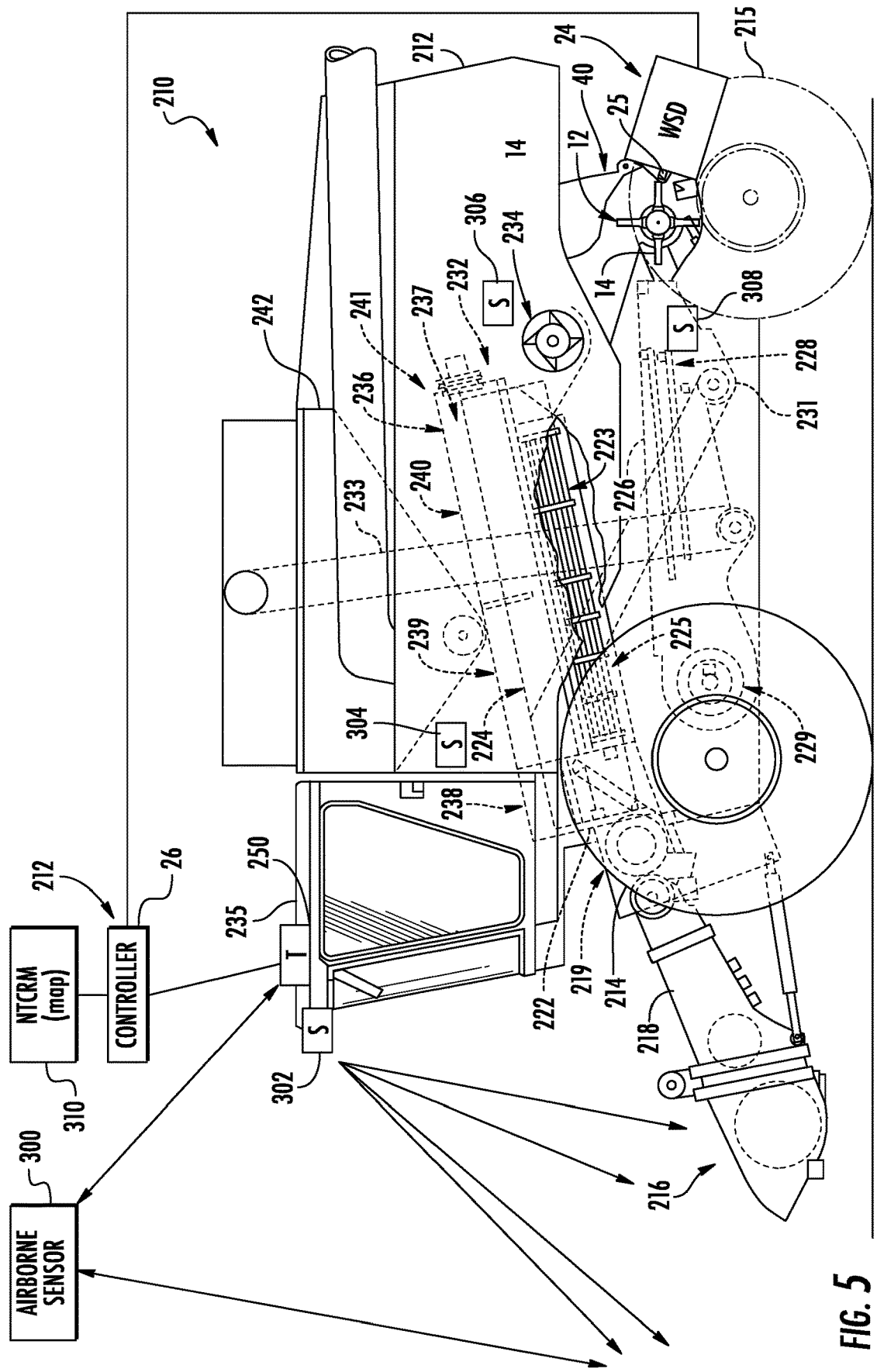
FIG. 5 is a side view illustrating an example harvester having an example weed seed control system.

FIG. 5 is a side view of an example harvester 210 including an example weed seed control system 212. In addition to weed seed control system 212, combine harvester 210 comprises a main frame 212 having wheel structure including front and rear ground engaging wheels 214 and 215 supporting the main frame for forward movement over a field of crop to be harvested. The front wheels 214 are driven by an electronically controlled hydrostatic transmission.

A vertically adjustable header or harvesting platform 216 is used for harvesting a crop and directing it to a feeder house 218. The feeder house 218 is pivotally connected to the frame 212 and includes a conveyor for conveying the harvested crop to a beater 219. The beater 219 directs the crop upwardly through an inlet transition section 222 to a rotary cleaning and separating assembly 224. In other implementations, other orientations and types of cleaning structures and other types of headers 216, such as transverse frame supporting individual row units, are utilized.

The rotary cleaning and separating assembly 224 threshes and separates the harvested crop material. Grain and crop residue, such as chaff, fall through a concave 225 and separation grates 223 on the bottom of the assembly 224 to a cleaning system 226, and are cleaned by a chaffer 227, sieve 228 and air fan or blower 229. The blower 229 blows the lighter crop residue above the chaffer 227 and above the sieve 228 rearwardly to the double-decker crop residue spreader 40. The grain passes through openings, between louvers, provided by the chaffer 227 and a sieve 228. The clean grain is directed to elevator 233. Clean grain elevator 233 conveys the grain to tank 242. The clean grain in the tank 242 can be unloaded into a grain cart or truck by unloading auger. Tailings fall into the return elevator or auger 231 and are conveyed to the rotor 237 where they are threshed a second time.

In one implementation, the weed seed data may comprise multiple different parameters or factors, wherein the instructions 48 cause the processing unit 42 compare each of the different parameters or factors to different thresholds and wherein the comparison may trigger the automatic output of control signals that adjust operation of the weed seed devitalizer 24. In one implementation, different weed seed parameters may have different weightings or weights depending upon the ascribed importance of such factors in the overall adjustment of weed seed devitalizer 24.

In the example illustrated, the rotary cleaning and separating assembly 224 comprises a cylindrical rotor housing 236 and a rotor 237 located inside the housing 236. The front part of the rotor and the rotor housing define the infeed section 738. Downstream from the infeed section 238 are the cleaning section 239, the separating section 240 and the discharge section 241. The rotor 237 in the infeed section 238 is provided with a conical rotor drum having helical infeed elements for engaging harvested crop material received from the beater 219 and inlet transition section 222.

In the cleaning section 239, the rotor 237 comprises a cylindrical rotor drum having a number of cleaning elements, sometimes called rasping bars, for cleaning the harvested crop material received from the infeed section 238. Downstream from the cleaning section 239 is the separating section 240 wherein the grain trapped in the threshed crop material is released and falls to the cleaning system 228.

Weed seed control system 212 comprises weed seed devitalizer 24 and controller 26. Weed seed devitalizing 24, in one implementation, may be implemented as weed seed devitalizer 124 shown in FIG. 3. In such an implementation, controller 26 may be similar to controller 26 shown in FIG. 2. As shown by FIG. 5, weed seed devitalizer 24 is supported a rear of harvester 210 and includes a forward opening 25 to receive biomass discharge, potentially including weed seeds, from chopper 14. In some implementations, weed seed devitalizer 24 may additionally receive material other than grain (MOG) from beater 234. Following devitalization, the weed seeds are discharged at the rear of harvester 210.

Controller 26 adjust the operational parameters of weed seed devitalizer 24 based upon data indicating forthcoming weed seeds, including both the presence of weed seeds, as well as the characteristics of the forthcoming weed seeds. In the example illustrated, system 212 comprises various sources of such weed seed data. As shown by FIG. 5, system 212 may additionally comprise airborne sensor 300, forward sensor 302, internal sensors 304, 306 and 308, and weed map 310.

Airborne sensor 300 senses weed or weed seed characteristics in regions of a field just in front of harvester 210 prior to harvester 210 severing the crops from the growing medium of the field. Airborne sensor 300 may detect such parameters such as weed density, weed health, weed type and the like. From such information, weed types may be identified in estimates may be made with regard to the quantity of expected forthcoming weed seed. Airborne sensor 300 may communicate in a wireless fashion with a transmitter 250 carried by harvester 210, wherein transceiver 250 is in communication with controller 26, relaying data from airborne sensor 300. Transceiver 250 may additionally receive geo-positional data regarding the position of harvester 210 as it traverses the field. For example, transceiver 250 may receive global positioning system data from a satellite. In one implementation, airborne sensor 300 may comprise a satellite. In another implementation, airborne sensor 300 may comprise a drone. In one implementation, transceiver 250 may output control signals controlling the position of the drone, causing the drone to track remain ahead of harvester 210 as it traverses a field, continuing to output signals to transceiver 250 and controller 26, continuing to provide weed seed data in a continuous and dynamic fashion to harvester 210 as it traverses the field.

Forward sensor 302 comprise a sensor mounted are supported proximate a front end of harvester 210. Sensor 302 is configured to sense regions in front of harvester 210 as well as to sense weeds being conveyed by portions of head 216. In one implementation, sensor 302 may comprise an optical sensor, wherein controller 26 utilizes optical recognition to distinguish between weeds and crop, to ascertain weed quantity and to distinguish between different types of weeds. In one implementation, sensor 302 may comprise a Lidar type sensor. In yet other implementations, sensor 302 may comprise other forwardly mounted sensors. The output from sensor 302, reflecting weed seed data, is transmitted to controller 26.

Internal sensors 304, 306, 308 comprise weed and/or seed detecting sensors located internally throughout various portions of the crop flow path through harvester 210. Such sensors may comprise infrared sensors, acoustic sensors, optical sensors or contact/vibration sensors. Sensor 304 is positioned above or proximate to separating assembly 224. Sensor 306 is located proximate to beater 234. Sensor 308 is located proximate to the sieves or chaffers of cleaning system 228. In other implementations, sensor 304, 306 and 308 may be provided at other locations along the general crop flow path through harvester 210. In yet other implementations, additional or fewer of such weed seed sensing or detecting sensors may be provided as part of harvester 210.

Weed map 310 comprises a historical digital map mapping weed to density and type two different regions of the field in which harvester 210 is harvesting a crop. Map 310 may have been previously formulated using data from an airborne sensor, such as a satellite a drone, which acquired such data prior to harvest, such as during the growing season for the crop. Map 310 may be formulated using data from an airborne sensor just prior to harvest. In some implementations, map 310 may additionally or alternatively comprise such mapped weed information from prior growing seasons or harvesting operations. In one implementation, map 310 may be provided in a non-transitory computer-readable medium (NTCRM) carried by harvester 210. In some implementations, the data of map 310 may be communicated to harvester 210, to transceiver 250, in a wireless fashion from a remote database or remote data source.

Controller 26 may utilize data from any, all or a sub-combination of sensor 300, sensor 304, 306, 308 and map 310 when generating control signals for adjusting the operational state or operational parameters of weed seed devitalizer 24. In some implementations, different weighting factors may be applied to the different data sources based upon empirically determined importance of the different data sources. For example, data from sensor 308 or 306, in close proximity to weed seed devitalizer 24, may be given a greater importance or greater weighting as compared to data received from sensor 304, more distant to devitalizer 24. Data received from forward sensor 302 may be given a lower weighting as compared to internal sensors 304, 306308. Data from airborne sensor 300 may be given a weight similar to sensor 302 or a lesser weight. In one implementation, data from map 310 may be given the lowest weighting due to its historical nature. In yet other implementations, other weighting schemes may be applied to the data from the different data sources by controller 26 when generating control signals for adjusting the operational parameters of weed seed devitalizer 24.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester comprising:
   a weed seed devitalizer;
   a sensor supported by the harvester within an interior of the harvester, wherein the sensor is configured to output data indicating forthcoming weed seeds; and
   a controller configured to:
     receive the data from the sensor indicating forthcoming weed seeds; and
     output control signals controlling the weed seed devitalizer based on the data.

2. The harvester of claim 1, wherein the control signals actuate the weed seed devitalizer between an off state and an on state.

3. The harvester of claim 1, wherein the control signals actuate the weed seed devitalizer from a first on state to a second on state different than the first on state.

4. The harvester of claim 3, wherein the weed seed devitalizer comprises a rotating weed seed impactor, wherein the impactor rotates at a first non-zero speed in the first on state and a second non-zero speed in the second on state.

5. The harvester of claim 1, wherein the data indicates a rate of forthcoming weed seeds and wherein the control signals controlling the weed seed devitalizer are based on the rate.

6. The harvester of claim 1, further comprising a second sensor configured to output second data indicating forthcoming weed seeds, wherein the controller is to receive the second data and wherein the control signals output by the controller to control the weed seed devitalizer are based upon a combination of the data and the second data.

7. The harvester of claim 6, wherein the sensor is a first type of sensor and wherein the second sensor is a second type of sensor different than the first type of sensor.

8. The harvester of claim 6, wherein the sensor is at a first location and wherein the second sensor is at a second location different than the first location.

9. The harvester of claim 6, wherein the controller applies a first weighting to the data from the sensor and applies a second weighting to the second data from the second sensor, the second weighting being different than the first weighting.

10. The harvester of claim 1, wherein the weed seed devitalizer is to apply radiation to the weed seeds and wherein the control signals control application of the radiation by the weed seed devitalizer based upon the data.

11. The harvester of claim 1, wherein the weed seed devitalizer is to apply radiation or a chemical to the weed seeds and wherein the control signals control application of the radiation or the chemical by the weed seed devitalizer based upon the data.

12. The harvester of claim 11, wherein the weed seed devitalizer comprises:
   a rotating weed seed impactor having an impaction chamber; and
   a chemical/radiation applicator to apply the radiation or the chemical to the weed seeds within the impaction chamber or during discharge of the weed seeds from the impaction chamber.

13. The harvester of claim 1 wherein the control signals output by the controller are additionally based upon historical map weed data.

14. A harvester comprising:
   a weed seed devitalizer;
   a sensor configured to output data indicating forthcoming weed seeds; and
   a controller configured to:
     receive the data from the sensor indicating forthcoming weed seeds;
     determine a type of weed seeds from the data; and
     output control signals controlling the weed seed devitalizer based on the determined type of weed seeds.

15. A harvester comprising:
   a weed seed devitalizer; and
   a controller configured to:
     receive first data from a first data source indicating forthcoming weed seeds;
     receive second data from a second source indicating forthcoming weed seeds; and
     output control signals automatically controlling the weed seed devitalizer based on a combination of the first data and the second data;
   wherein the harvester further comprises:
     a first sensor carried by the harvester and outputting the first data and a second sensor carried by the harvester and outputting the second data;
     wherein the first sensor is located within an interior of the harvester.

16. The harvester of claim 15 further comprising:
   a separating assembly;
   a beater;
   a sieve; and
   wherein the first sensor is located proximate to one of the separating assembly of the harvester, the beater of the harvester and the sieve of the harvester.

17. The harvester of claim 16, wherein the second sensor is within an interior of the harvester to output the second data, wherein the second sensor is located at another of the separating assembly the harvester, the beater of the harvester and the sieve of the harvester.

18. The harvester of claim 15, wherein the first data is from an airborne sensor, the harvester further comprising a receiver to wirelessly receive the first data from the airborne sensor.

* * * * *